(12) United States Patent
Koh et al.

(10) Patent No.: US 12,221,187 B2
(45) Date of Patent: Feb. 11, 2025

(54) APPARATUS FOR OPERATING DISPLAY TYPE VEHICLE SWITCH, AND METHOD THEREOF

(71) Applicants: Hyundai Motor Company, Seoul (KR); Kia Corporation, Seoul (KR); LS Automotive Technologies Co., Ltd., Gyeonggi-do (KR)

(72) Inventors: Jin Young Koh, Gyeonggi-do (KR); Jun Hwan Lee, Gyeonggi-do (KR)

(73) Assignees: Hyundai Motor Company, Seoul (KR); Kia Corporation, Seoul (KR); LS Automotive Technologies Co., Ltd., Gyeonggi-do (KR)

( * ) Notice: Subject to any disclaimer, the term of this patent is extended or adjusted under 35 U.S.C. 154(b) by 316 days.

(21) Appl. No.: 17/747,266

(22) Filed: May 18, 2022

(65) Prior Publication Data

US 2023/0074687 A1    Mar. 9, 2023

(30) Foreign Application Priority Data

Sep. 6, 2021    (KR) .......................... 10-2021-0118652

(51) Int. Cl.
*B60K 35/81*    (2024.01)
*B60K 35/00*    (2006.01)
*B62K 11/14*    (2006.01)
*B60K 35/10*    (2024.01)

(52) U.S. Cl.
CPC .............. *B62K 11/14* (2013.01); *B60K 35/00* (2013.01); *B60K 35/10* (2024.01); *B60K 35/81* (2024.01); *B60K 2360/126* (2024.01); *B60Y 2200/12* (2013.01)

(58) Field of Classification Search
CPC .... B60Q 1/1469; B60Q 1/1476; B62K 11/14; B60K 35/00; B60K 35/10; B60K 35/81; B60K 2360/126
See application file for complete search history.

(56) References Cited

U.S. PATENT DOCUMENTS

| | | | |
|---|---|---|---|
| 6,403,900 | B2 | 6/2002 | Hecht et al. |
| 9,310,949 | B2 | 4/2016 | Kaiser et al. |
| 11,001,207 | B2 | 5/2021 | Sakal et al. |
| 2004/0122564 | A1 | 6/2004 | Ogasawara |
| 2006/0190144 | A1 | 8/2006 | Ogasawara |
| 2015/0375678 | A1 | 12/2015 | Salter et al. |
| 2016/0152258 | A1 | 6/2016 | Walter et al. |
| 2016/0264070 | A1* | 9/2016 | Urakami ............... B60R 16/005 |

FOREIGN PATENT DOCUMENTS

| | | | |
|---|---|---|---|
| JP | 2004-196183 A | 7/2004 | |
| JP | 2005302561 A | * 10/2005 | ............. B60K 35/00 |
| KR | 2021-0010111 A | 1/2021 | |

* cited by examiner

*Primary Examiner* — Kenneth J Malkowski
(74) *Attorney, Agent, or Firm* — Fox Rothschild LLP

(57) ABSTRACT

An apparatus for operating a display type vehicle switch includes a controller that controls one or more symbols related to a function of a vehicle to be displayed on a display, the display that displays the one or more symbols, and a selection device that selects at least one of the one or more symbols displayed on the display.

12 Claims, 5 Drawing Sheets

APPARATUS FOR OPERATING DISPLAY TYPE VEHICLE SWITCH, AND METHOD THEREOF

CROSS-REFERENCE TO RELATED APPLICATION

This application claims under 35 U.S.C. § 119(a) the benefit of Korean Patent Application No. 10-2021-0118652, filed in the Korean Intellectual Property Office on Sep. 6, 2021, the entire contents of which are incorporated herein by reference.

BACKGROUND

(a) Technical Field

The present disclosure relates to an apparatus and a method for operating a display type switch for a vehicle.

(b) Description of the Related Art

In general, a switch connected to a steering wheel of a vehicle may be manufactured or used while a symbol indicating a function of the vehicle is engraved in or printed on the switch. However, in the case of such a switch, when a model of the vehicle is changed or software of the vehicle is updated, there is a problem in that the switch itself needs to be reproduced or replaced.

In addition, there is a problem in that a display type vehicle switch that has a complicated operation may compromise the well-being of a vehicle driver who performs a switching operation while driving.

SUMMARY

An aspect of the present disclosure provides an apparatus and a method for continuously updating a symbol indicating a function using a display type switch in an apparatus for operating the switch connected to a steering wheel of a vehicle.

Another aspect of the present disclosure provides an apparatus and a method for allowing a user to easily select a symbol of an apparatus for operating a display type vehicle switch even while the vehicle is driving.

The technical problems to be solved by the present disclosure are not limited to the aforementioned problems, and any other technical problems not mentioned herein will be clearly understood from the following description by those skilled in the art to which the present disclosure pertains.

According to an aspect of the present, an apparatus for operating a display type vehicle switch may include a controller that controls one or more symbols related to a function of a vehicle to be displayed on a display, the display that displays the one or more symbols, and a selection device that selects at least one of the one or more symbols displayed on the display.

According to embodiments, the controller may control one or more symbols related to the function of the vehicle to be displayed on the display based on interface information.

According to embodiments, the interface information may represent information for determining arrangement of the one or more symbols to be displayed on the display, and the interface information may represent any one of first interface information or second interface information.

According to embodiments, the controller may control one or more symbols related to the function of the vehicle to be displayed on the display based on a first interface in response to receiving the first interface information, and control one or more symbols related to the function of the vehicle displayed on the display based on a second interface in response to not receiving the first interface information.

According to embodiments, the first display information may represent interface information received from a user, and the second display information may represent preset interface information.

According to embodiments, the one or more symbols may include at least one symbol from among a symbol related to a head lamp function of the vehicle, a symbol related to a front fog lamp function of the vehicle, a symbol related to a rear fog lamp function of the vehicle, or a symbol related to a wiper function of the vehicle.

According to embodiments, the selection device may select the at least one symbol from among the one or more symbols based on a switch connected to the display to rotate.

According to embodiments, the at least one symbol may be selected based on a rotation direction and a rotation angle of the switch.

According to embodiments, the rotation direction may include a first direction and a second direction, the first direction may represent a clockwise rotation direction of a shaft connecting the display and the switch, and the second direction may represent a counterclockwise rotation direction of the shaft connecting the display and the switch.

According to embodiments, the one or more symbols may include at least one of an image type symbol or a text type symbol.

According to an aspect of the present, a method for operating a display type vehicle switch may include controlling one or more symbols related to a function of a vehicle to be displayed on a display, displaying the one or more symbols on the display, and selecting at least one of the one or more symbols displayed on the display.

According to embodiments, the displaying of the one or more symbols may include controlling one or more symbols related to the function of the vehicle to be displayed on the display based on interface information.

According to embodiments, the interface information may represent information for determining arrangement of the one or more symbols to be displayed on the display, and the interface information may represent any one of first interface information or second interface information.

According to embodiments, the displaying of the one or more symbols may include controlling one or more symbols related to the function of the vehicle to be displayed on the display based on a first interface in response to receiving the first interface information, and controlling one or more symbols related to the function of the vehicle displayed on the display based on a second interface in response to not receiving the first interface information.

According to embodiments, the first display information may represent interface information received from a user, and the second display information may represent preset interface information.

According to embodiments, the one or more symbols may include at least one of a symbol related to a head lamp function of the vehicle, a symbol related to a front fog lamp function of the vehicle, a symbol related to a rear fog lamp function of the vehicle, or a symbol related to a wiper function of the vehicle.

According to embodiments, the selecting of the at least one symbol may include selecting the at least one symbol from among the one or more symbols based on a switch connected to the display to rotate.

According to embodiments, the at least one symbol may be selected based on a rotation direction and a rotation angle of the switch.

According to embodiments, the rotation direction may include a first direction and a second direction, and the first direction may represent a clockwise rotation direction of a shaft connecting the display and the switch, and the second direction may represent a counterclockwise rotation direction of the shaft connecting the display and the switch.

According to embodiments, the one or more symbols may include at least one of an image type symbol or a text type symbol.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
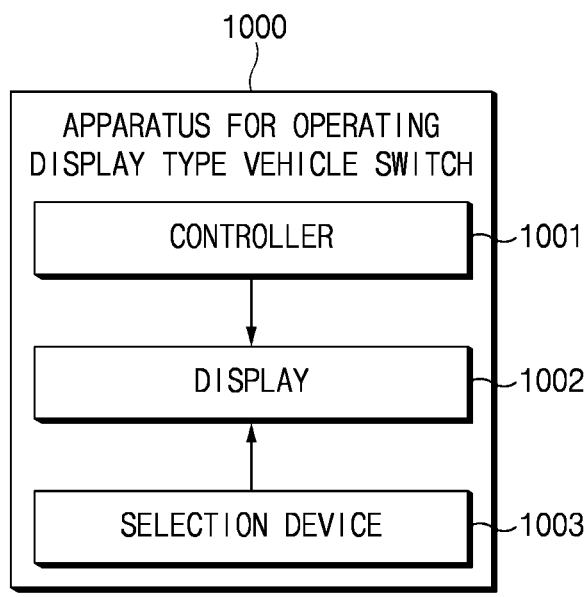
FIG. 1 illustrates an example of an apparatus for operating a display type vehicle switch according to embodiments.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present disclosure will be described below in detail with reference to FIGS. 1 to 6.

FIG. 1 is a block diagram showing an example of an apparatus for operating a display type vehicle switch (or an apparatus 1000) according to embodiments of the disclosure.

The display type vehicle switch (or switch) according to embodiments may refer to a switch connected to a steering wheel of the vehicle. For example, the switch may refer to a steering column switch connected to a steering wheel of the vehicle to control a headlight function or a wiper function of the vehicle.

The apparatus for operating the display type vehicle switch according to the embodiments may include the above-described display type vehicle switch or may be an apparatus for operating the display type vehicle switch.

In general, a switch connected to a steering wheel of a vehicle may be manufactured or used while a symbol indicating a function of the vehicle is engraved in or printed on the switch. However, in the case of such a switch, when a model of the vehicle is changed or software of the vehicle is updated, there is a problem in that the switch itself needs to be reproduced or replaced.

In addition, there is a problem in that a display type vehicle switch that has a complicated operation also may compromise the well-being of a vehicle driver who performs a switching operation while driving.

The apparatus according to embodiments may continuously update a symbol indicating a function using a display type switch in an apparatus for operating a switch connected to a steering wheel of a vehicle. In addition, the apparatus may allow the vehicle driver to easily select a symbol of the apparatus for operating the display type vehicle switch even while driving.

The apparatus for operating the display type vehicle switch according to embodiments may include a controller 1001, a display 1002, and/or a selection device 1003. The apparatus according to the embodiments may further include one or more elements not shown in FIG. 1.

The controller according to the embodiments may control one or more symbols related to functions of the vehicle displayed on the display. Specifically, the controller may control one or more symbols related to functions of the vehicle displayed on the display based on interface information.

The one or more symbols may include at least one of a symbol related to a head lamp function of a vehicle, a symbol related to a front fog lamp function of a vehicle, a symbol related to a rear fog lamp function of a vehicle, or a symbol related to a wiper function of a vehicle. The one or more symbols may include at least one of an image type symbol or a text type symbol.

The interface information according to embodiments may be information about an interface of one or more symbols displayed on the display. For example, the interface information may be information for determining arrangement of one or more symbols to be displayed on the display.

The interface information may indicate any one of first interface information and/or second interface information. The first interface information according to embodiments may be interface information received from a user or a server. The second interface information according to embodiments may be interface information preset (or stored) in the controller (or apparatus).

The display according to embodiments may display one or more symbols. Specifically, the display may display symbols based on the above-described interface information. The user (or driver) of the vehicle may identify a symbol(s) related to a function of the vehicle through the display.

The selection device according to embodiments may select at least one symbol from among one or more symbols displayed on the display. That is, the user may select at least one symbol among the symbols displayed on the display through the selection device. The vehicle may perform an operation related to a function corresponding to the selected symbol. For example, when a symbol related to a front fog lamp function of the vehicle is selected by the selection device, a front fog lamp of the vehicle may be turned on.

In the apparatus according to the embodiments, a vehicle switch connected to a steering wheel of the vehicle may be configured as a display type through the method described with reference to FIG. 1 to enable the apparatus to be reused despite a change in the model of the vehicle, update of software of the vehicle, or the like. In addition, the apparatus may safely perform a vehicle function intended by a vehicle user while the vehicle is driving through easy operation of the apparatus for operating the display type vehicle switch.

Figure 2:
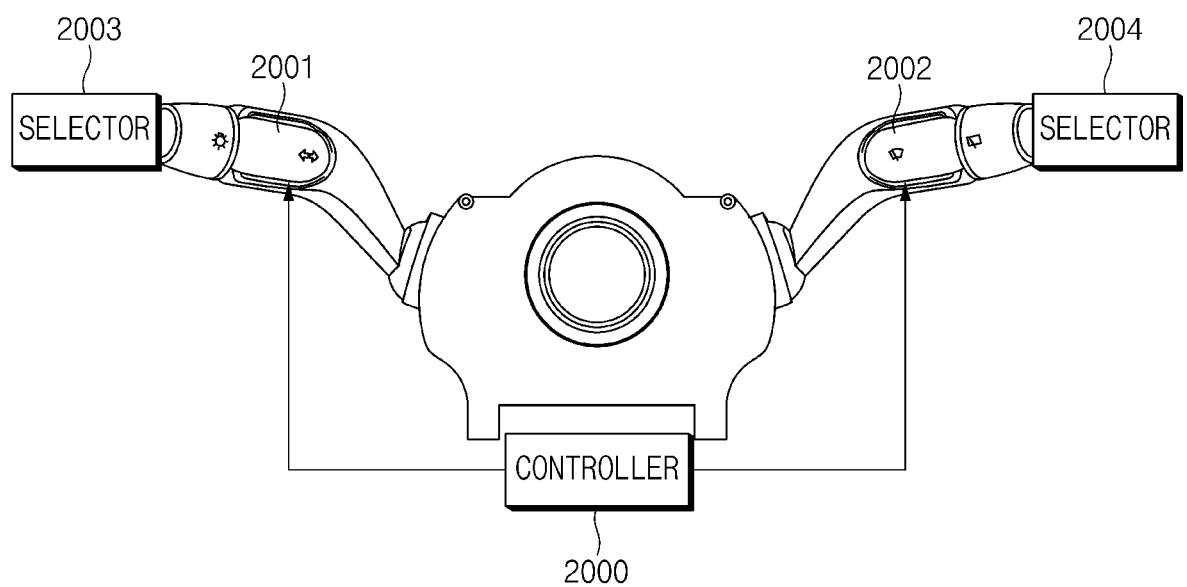
FIG. 2 illustrates an example of an apparatus for operating a display type vehicle switch according to embodiments.

FIG. 2 is a block diagram showing an example of an apparatus for operating a display type vehicle switch (an apparatus 2000 described above with reference to FIG. 1) according to embodiments.

As described above with reference to FIG. 1, the apparatus may be connected to a steering wheel of a vehicle, and the apparatus may include a controller, a display and/or a selection device. Detailed descriptions of the controller, the display and the selection device are the same as described above with reference to FIG. 1. In addition, the apparatus according to the embodiments may further include one or more elements not shown in FIG. 1. For example, the apparatus may further include a steering angle sensor (SAS), a lever, or the like.

Reference numeral 2000 indicates the controller. Reference numerals 2001 and 2002 indicate the display. Reference numerals 2003 and 2004 indicate the selection device.

As described above with reference to FIG. 1, the controller may determine (or control) one or more symbols to be displayed on the display based on interface information. Also, the user of the vehicle may select at least one symbol from among the symbols displayed on the display through the selection device. The vehicle may perform a function corresponding to the symbol selected by the user.

As in reference numerals 2003 and 2004, the selection device may be connected to the display. For example, the selection device may select at least one symbol from among one or more symbols based on a switch connected to the display to rotate. The selection device may indicate or include the switch.

That is, the user may select at least one symbol by operating the selection device (or switch) connected to the display. For example, the user may select at least one symbol based on a rotation direction and a rotation angle of the switch connected to the display. A detailed description of a process in which a user selects at least one symbol displayed on the display by operating the switch will be described later with reference to FIG. 3.

In the apparatus according to the embodiments, a vehicle switch connected to a steering wheel of the vehicle may be configured as a display type through the method described with reference to FIG. 3 to enable the apparatus to be reused despite a change in the model of the vehicle, update of software of the vehicle, or the like. In addition, the apparatus may safely perform a vehicle function intended by a vehicle user while the vehicle is driving through easy operation of the apparatus for operating the display type vehicle switch.

Figure 3:
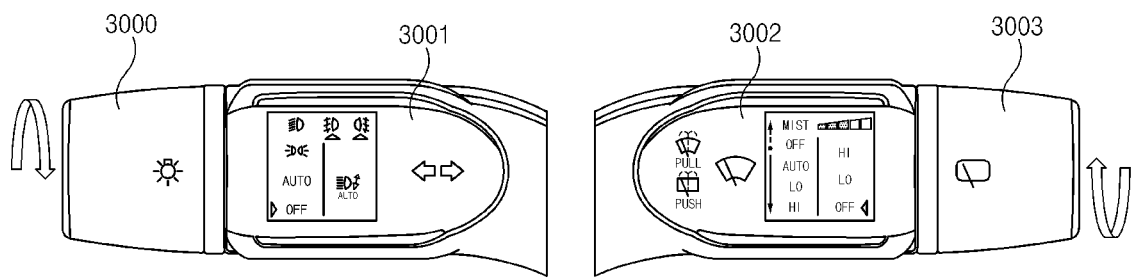
FIG. 3 illustrates an example of an operation of selecting at least one symbol from among one or more symbols displayed on a display according to embodiments.

FIG. 3 is a diagram for describing an example of an operation of selecting at least one symbol from among one or more symbols displayed on a display according to embodiments.

As described above with reference to FIGS. 1 and 2, a user may select at least one symbol from among symbols displayed on a display by operating a switch (or selection device). In addition, as described above with reference to FIG. 2, at least one symbol may be selected based on a rotation direction and a rotation angle of the switch connected to the display.

Detailed descriptions of the switch, the selection device, the display, and the symbol are the same as or similar to those described above with reference to FIGS. 1 to 2.

Reference numerals 3000 and 3003 indicate the above-described switch (or selection device). Reference numerals 3001 and 3002 may indicate the above-described display.

Like reference numerals 3000 and 3001, the switch may be connected to the display. In addition, the switch may be connected to the display to rotate.

The rotation direction according to embodiments may include a first direction and a second direction. The first direction according to embodiments may indicate a clockwise rotation direction of a shaft connecting the display and the switch. The second direction according to embodiments may indicate a counterclockwise rotation direction of the shaft connecting the display and the switch. That is, the switch may be rotated in one of the first direction and the second direction to select a symbol displayed on the display.

Based on a rotation angle according to the embodiments, the controller may select different symbols. The rotating switch may select different symbols according to a criterion for dividing 360 degrees into one or more stages. For example, 360 degrees in which the switch is rotated may be equally divided into four stages. In this case, when the switch is rotated by 40 degrees and when the switch is rotated by 100 degrees, the selected symbols may be different from each other.

Reference numeral 3000 may indicate a switch connected to the display 3001 to rotate in the first direction described above. Reference numeral 3001 may be a display that displays a symbol(s) related to a headlamp function of a vehicle. For example, the symbol displayed on the display 3001 may represent a symbol indicating that the headlamp is turned on, a symbol indicating the AUTO state of the headlamp, and/or a symbol indicating the OFF state of the headlamp.

A direction indicating a selection order of symbols displayed on the display may coincide with a rotation direction of the switch connected to the display. For example, as shown in reference numeral 3001, the current symbol indicates an OFF state, and the symbol selected when the switch 3000 is rotated in the second direction (counterclockwise direction) may be a symbol indicating an AUTO state.

In the apparatus according to the embodiments, a vehicle switch connected to a steering wheel of the vehicle may be configured as a display type through the method described with reference to FIG. 3 to enable the apparatus to be reused despite a change in the model of the vehicle, update of software of the vehicle, or the like. In addition, the apparatus may safely perform a vehicle function intended by a vehicle user while the vehicle is driving through easy operation of the apparatus for operating the display type vehicle switch.

Figure 4:
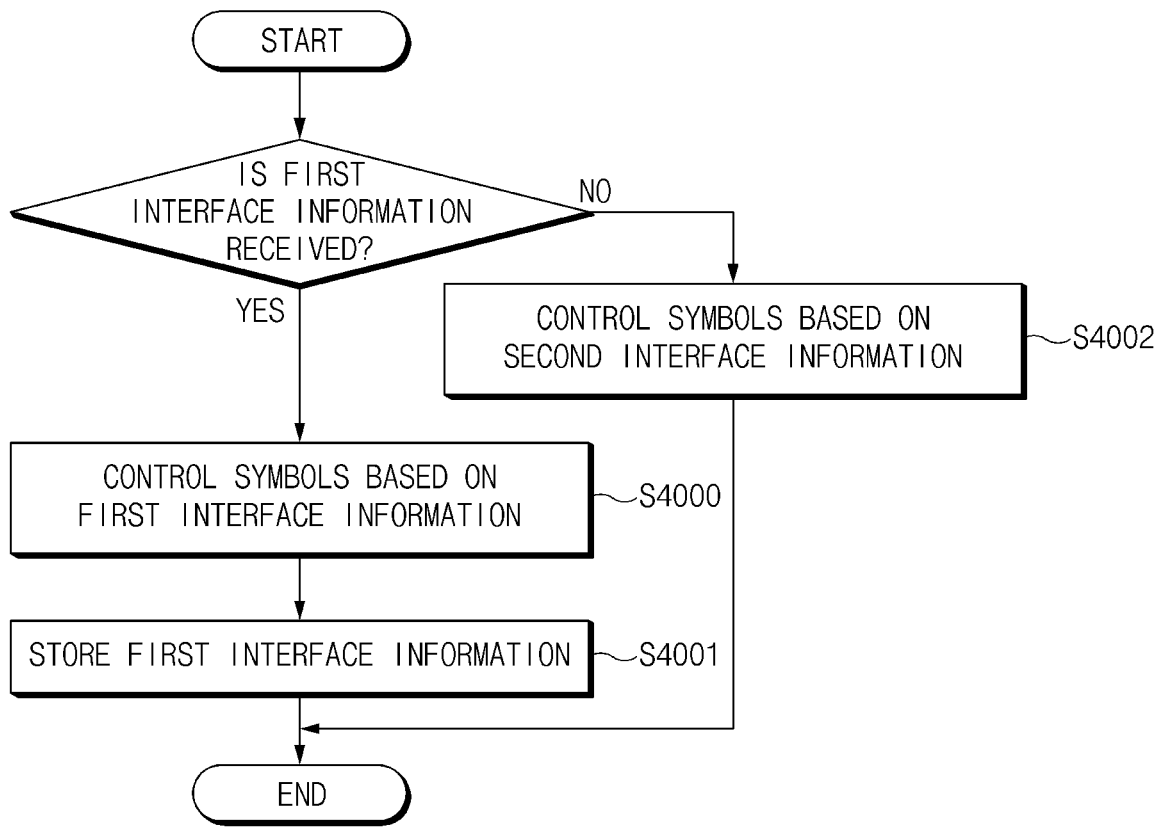
FIG. 4 illustrates an example of a method for controlling one or more symbols related to a function of a vehicle in a controller according to embodiments.

FIG. 4 shows an example of a method for controlling one or more symbols related to a function of a vehicle in a controller (the controller described above with reference to FIG. 1) (or method) according to embodiments.

As described above with reference to FIGS. 1 and 2, the controller may control one or more symbols to be displayed on the display based on interface information. Also, as described above with reference to FIG. 1, the interface information may include first interface information and/or second interface information. Also, as described above with reference to FIG. 1, the first interface information may be interface information received from a server or a user, and the second interface information may be interface information preset in the controller.

That is, when initially controlling symbols displayed on a display, the controller may use the second interface information previously stored (or set) in the controller. The second interface information may be interface information previously stored in a memory included in the controller.

As described above, the first interface information may be interface information received from a user (or server). For example, the first interface information may be interface information regarding the upgrade of a model of the vehicle and/or software of the vehicle.

That is, in response to receiving the first interface information, the controller may control one or more symbols related to a function of the vehicle to be displayed on the display based on a first interface (S4000).

Thereafter, the controller may store the first interface information (S4001). For example, the controller may store the first interface information in a nonvolatile memory included in the controller. Accordingly, the controller may control the symbols later based on the first interface information. Accordingly, the controller may reflect the change of a model of the vehicle and/or the update of software of the vehicle later.

That is, in response to not receiving the first interface information, the controller may control one or more symbols related to a function of the vehicle to be displayed on the display based on a second interface (S4002). That is, when the above-described first interface information is not received, the controller may control symbols to be displayed on the display based on the second interface information pre-stored in the memory of the controller.

In the apparatus according to the embodiments, a vehicle switch connected to a steering wheel of the vehicle may be configured as a display type through the method described with reference to FIG. 4 to enable the apparatus to be reused despite a change in the model of the vehicle, update of software of the vehicle, or the like. In addition, the apparatus may safely perform a vehicle function intended by a vehicle user while the vehicle is driving through easy operation of the apparatus for operating the display type vehicle switch.

Figure 5:
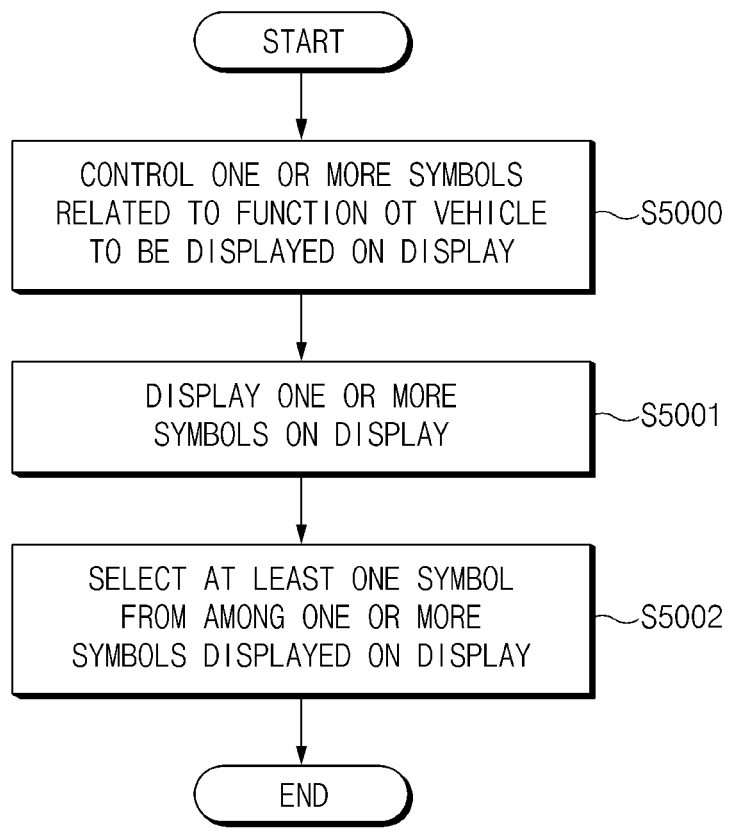
FIG. 5 illustrates an example of a method for operating a display type vehicle switch according to embodiments.

FIG. 5 shows an example of a method for operating a display type vehicle switch (or the method) according to embodiments.

The apparatus described above with reference to FIGS. 1 to 4 may perform the method described with reference to FIG. 5.

The method according to the embodiments may include controlling one or more symbols related to a function of the vehicle to be displayed on the display (S5000), displaying the one or more symbols on the display (S5001), and selecting at least one symbol from among the one or more symbols displayed on the display (S5002). The method may further include one or more operations not shown in FIG. 5.

According to embodiments, S5000 may include controlling one or more symbols related to a function of the vehicle to be displayed on the display based on interface information.

According to embodiments, the interface information may represent information for determining arrangement of one or more symbols to be displayed on the display. The interface information may represent any one of first interface information or second interface information.

According to embodiments, the controlling of one or more symbols may include controlling one or more symbols related to a function of a vehicle to be displayed on the display based on the first interface in response to receiving a first interface information and controlling one or more symbols related to the function of the vehicle displayed on the display based on a second interface in response to not receiving the first interface information.

According to embodiments, the first interface information may be interface information received from a user. According to embodiments, the second interface information may be preset interface information.

According to embodiments, the one or more symbols may include at least one of a symbol related to a head lamp function of a vehicle, a symbol related to a front fog lamp function of a vehicle, a symbol related to a rear fog lamp function of a vehicle, or a symbol related to a wiper function of a vehicle.

According to embodiments, S5002 may include selecting at least one symbol from among one or more symbols based on a switch connected to the display to rotate.

According to embodiments, the at least one symbol may be selected based on a rotation direction and a rotation angle of the switch.

According to the embodiments, the rotation direction may include a first direction and a second direction. According to embodiments, the first direction according to embodiments may indicate a clockwise rotation direction of a shaft connecting the display and the switch. According to embodiments, the second direction may indicate a counterclockwise rotation direction of the shaft connecting the display and the switch.

According to embodiments, the one or more symbols may include at least one of an image type symbol or a text type symbol.

Detailed descriptions of the display, the one or more symbols, the interface information, the first interface information, the second interface information, the switch, the rotation direction and the rotation angle are the same as or similar to those described above.

The above description is merely illustrative of the technical idea of the present disclosure, and various modifications and variations may be made without departing from the essential characteristics of the present disclosure by those skilled in the art to which the present disclosure pertains.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

According to embodiments, it is possible to continuously update a symbol indicating a function using a display type switch in an apparatus for operating a switch connected to a steering wheel of a vehicle.

According to embodiments, it is possible to allow a user to easily select a symbol of an apparatus for operating a display type vehicle switch even while the vehicle is driving.

In addition, various effects may be provided that are directly or indirectly understood through the disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for operating a display type vehicle switch comprising:
    a controller configured to control one or more symbols related to a function of a vehicle to be displayed on a display;
    the display connected to a lever and configured to display the one or more symbols; and
    switch connected to the lever and configured to rotate,
    wherein the one or more symbols are displayed along a rotation direction of the switch,
    wherein the controller is configured to determine a selection order of the one or more symbols in a same direction as a rotation direction of the switch, and
    wherein a rotation axis of the switch is parallel to a longitudinal axis of the switch.

2. The apparatus of claim 1, wherein the controller is configured to control the one or more symbols related to the function of the vehicle to be displayed on the display based on interface information.

3. The apparatus of claim 2, wherein the interface information is stored in a memory and represents information for determining an arrangement of the one or more symbols to be displayed on the display, and
    wherein the interface information is updated based on information received from outside the vehicle.

4. The apparatus of claim 1, wherein the one or more symbols includes at least one symbol from among a symbol related to a head lamp function of the vehicle, a symbol related to a front fog lamp function of the vehicle, a symbol related to a rear fog lamp function of the vehicle, or a symbol related to a wiper function of the vehicle.

5. The apparatus of claim 1, wherein the rotation direction includes a first direction and a second direction,
    wherein the first direction represents a clockwise rotation direction of a shaft connecting the display and the switch, and
    wherein the second direction represents a counterclockwise rotation direction of the shaft connecting the display and the switch.

6. The apparatus of claim 1, wherein the one or more symbols includes at least one of an image type symbol or a text type symbol.

7. A method for operating a display type vehicle switch comprising:
    controlling one or more symbols related to a function of a vehicle to be displayed on a display;
    displaying the one or more symbols on the display; and
    selecting at least one of the one or more symbols displayed on the display,
    wherein the one or more symbols are displayed along a rotation direction of the switch,
    wherein the controller is configured to determine a selection order of the one or more symbols in a same direction as a rotation direction of the switch, and
    wherein a rotation axis of the switch is parallel to a longitudinal axis of the switch.

8. The method of claim 7, wherein displaying the one or more symbols includes controlling the one or more symbols related to the function of the vehicle to be displayed on the display based on interface information.

9. The method of claim 8, wherein the interface information is stored in a memory and represents information for determining an arrangement of the one or more symbols to be displayed on the display, and
    wherein the interface information is updated based on information received from outside the vehicle.

10. The method of claim 7, wherein the one or more symbols includes at least one of a symbol related to a head lamp function of the vehicle, a symbol related to a front fog lamp function of the vehicle, a symbol related to a rear fog lamp function of the vehicle, or a symbol related to a wiper function of the vehicle.

11. The method of claim 7, wherein the rotation direction includes a first direction and a second direction,
    wherein the first direction represents a clockwise rotation direction of a shaft connecting the display and the switch, and
    wherein the second direction represents a counterclockwise rotation direction of the shaft connecting the display and the switch.

12. The method of claim 7, wherein the one or more symbols includes at least one of an image type symbol or a text type symbol.

\* \* \* \* \*